US006463032B1

(12) United States Patent
Lau et al.

(10) Patent No.: US 6,463,032 B1
(45) Date of Patent: Oct. 8, 2002

(54) NETWORK SWITCHING SYSTEM HAVING OVERFLOW BYPASS IN INTERNAL RULES CHECKER

(75) Inventors: Michael Vengchong Lau, Cupertino; Shashank C. Merchant, Sunnyvale; John M. Chiang, San Jose, all of CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/238,047

(22) Filed: Jan. 27, 1999

(51) Int. Cl.[7] .............................................. H04L 12/54
(52) U.S. Cl. ...................... 370/218; 370/414; 370/428; 370/429
(58) Field of Search ................................. 370/229, 231, 370/235, 216–218, 221, 412–414, 416, 418, 428, 429

(56) References Cited

U.S. PATENT DOCUMENTS

| 5,515,376 A | 5/1996 | Murphy et al. ............. 370/402 |
| 5,603,064 A | * 2/1997 | Bennett ..................... 359/139 |
| 6,185,630 B1 | * 2/2001 | Simmons ..................... 710/10 |
| 6,192,028 B1 | * 2/2001 | Simmons et al. ........... 370/229 |
| 6,233,244 B1 | * 5/2001 | Runaldue et al. ........... 370/412 |

* cited by examiner

Primary Examiner—Hassan Kizou
Assistant Examiner—Saba Tsegaye (57) ABSTRACT

A novel method of overflow data handling in a multiport data switching system having a decision making engine for controlling data forwarding between receive ports and at least one transmit port. Data blocks representing received data packets are placed in data queues corresponding to the receive ports. The data queues are transferred to logic circuitry for processing in accordance with a prescribed algorithm. Then, a forwarding decision is made to determine the transmit port. An overflow bypass is provided to allow at least a portion of a data block to bypass the logic circuitry, when at least one of the data queues is in an overflow state. For example, pointers indicating memory locations for storing the corresponding received data packets may be transferred via the overflow bypass when the overflow state is detected.

20 Claims, 8 Drawing Sheets

FIG. 6

NETWORK SWITCHING SYSTEM HAVING OVERFLOW BYPASS IN INTERNAL RULES CHECKER

FIELD OF THE INVENTION

This invention relates to data communication systems, and more particularly, to a system for preventing loss of data due to overflow conditions in a network switching system.

BACKGROUND ART

A multiport switch may be provided in a data communication network to enable data communication between multiple network stations connected to various ports of the switch. A logical connection may be created between receive ports and transmit ports of the switch to forward received frames to appropriate destinations. Based on frame header information, a decision making engine selectively controls forwarding of received frames to a destination station.

To prevent loss of data due to overflow conditions, it would be convenient to provide the decision making engine with an overflow mechanism that creates a bypass for overflow data.

DISCLOSURE OF THE INVENTION

The invention provides a novel method of overflow data handling in a multiport data switching system having a decision making engine for controlling data forwarding between receive ports and at least one transmit port. Data blocks representing received data packets are placed in data queues corresponding to the receive ports. The data queues are transferred to logic circuitry for processing in accordance with a predetermined algorithm. Then, a forwarding decision is made to determine the at least one transmit port. An overflow bypass is provided to allow at least a portion of a data block to bypass the logic circuitry, when at least one of the data queues is in an overflow state.

In accordance with one aspect of the invention. each data block includes a pointer for indicating a memory location for storing the received data packet. The pointers are allowed to bypass the logic circuitry when the overflow state is detected.

Preferably, overflow data is buffered in overflow registers allocated to the receive ports. When the overflow state is detected, the overflow data is placed in a first section of the corresponding overflow register. The overflow data is transferred from the first section to a second section of the overflow register when the end of a data packet represented by the overflow data is detected.

In accordance with another aspect of the invention, the decision making engine includes a plurality of queuing devices corresponding to the plurality of the receive ports for queuing data blocks representing the data packets received by the corresponding receive ports. Logic circuitry is responsive to the plurality of queuing devices for processing the data blocks in accordance with a predetermined algorithm. A forwarding circuit is responsive to the logic circuitry for identifying the selected transmit port for each data packet. An overflow handling circuit provides an overflow bypass for bypassing the logic circuitry to transfer at least a portion of a data block representing received data packet directly to the forwarding circuit when at least one of the plurality of the queuing devices is in an overflow state.

In accordance with a preferred embodiment of the invention, the overflow handling circuit comprises at least one arbitrator for performing arbitration between requests for access to the forwarding circuit for the plurality of overflow registers. The receive ports may include regular ports, at least one high-speed port for receiving data packets at a rate higher than a rate at the regular ports, and at least one expansion port for receiving data packets from other communication systems. The requests for access to the forwarding circuit for the overflow registers allocated to the high-speed and expansion ports may have a higher priority than requests for access to the forwarding circuit for the overflow registers allocated to the regular ports. The overflow handling circuit may comprise a first arbitrator for performing arbitration between requests for access to the forwarding circuit for the overflow registers allocated to the regular ports, and a second arbitrator for performing arbitration between requests for access to the forwarding circuit for the overflow registers allocated to the high-speed and expansion ports. In response to a request for access to the forwarding circuit for a given overflow register, each arbitrator produces a grant signal for enabling the forwarding circuit to receive the data from that overflow register.

Various objects and features of the present invention will become more readily apparent to those skilled in the art from the following description of a specific embodiment thereof, especially when taken in conjunction with the accompanying drawings.

BEST MODE FOR CARRYING OUT THE INVENTION

Figure 1:
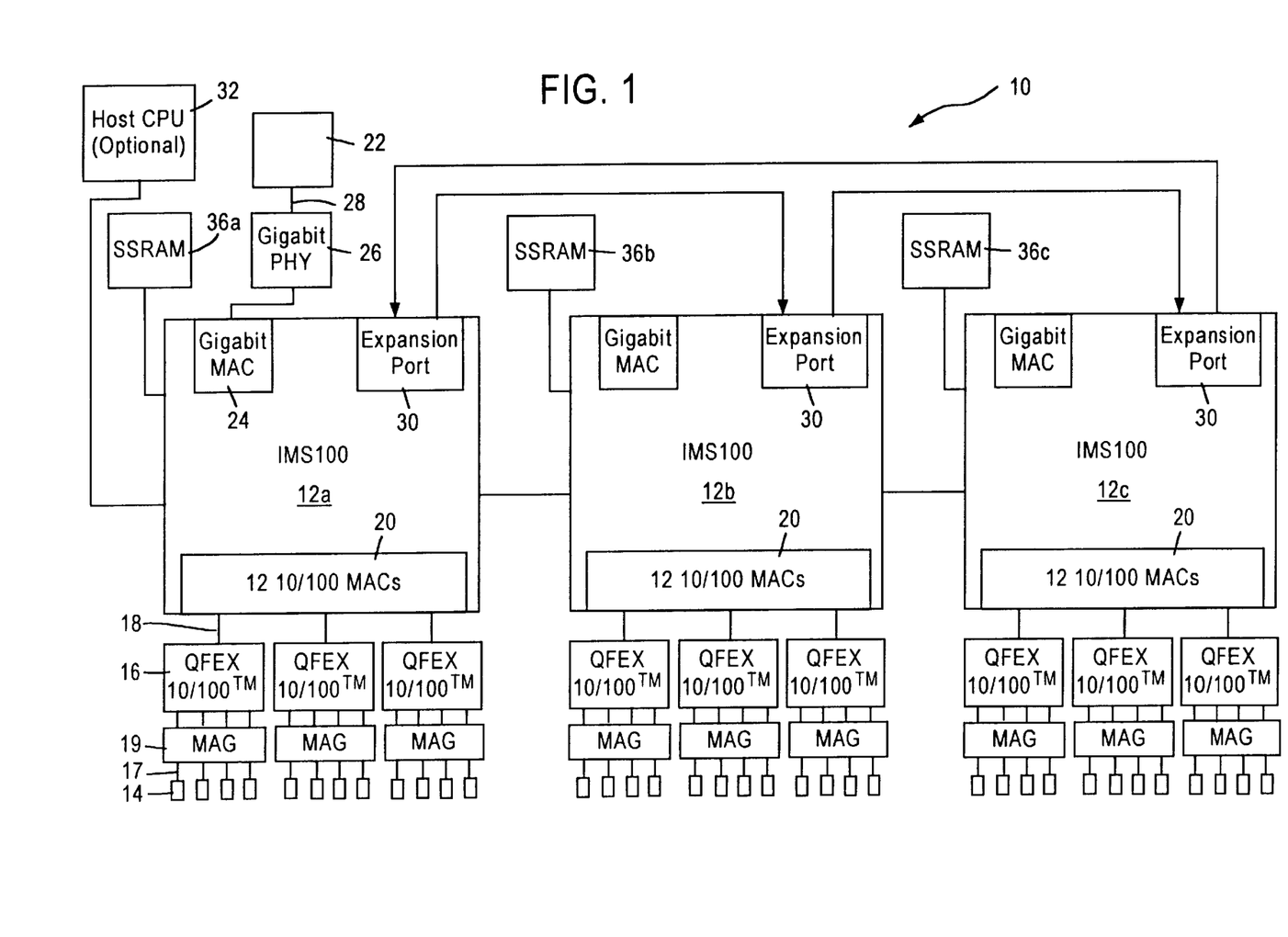
FIG. 1 is a block diagram of a packet switched network including a multiple port switch according to an embodiment of the present invention.

FIG. 1 is a block diagram of an exemplary system in which the present invention may be advantageously employed. The exemplary system 10 is a packet switched network, such as an Ethernet (IEEE 802.3) network. The packet switched network includes integrated multiport switches (IMS) 12 that enable communication of data packets between network stations. The network may include network stations having different configurations, for example twelve (12) 10 megabit per second (Mb/s) or 100 Mb/s network stations 14 (hereinafter 10/100 Mb/s) that send and receive data at a network data rate of 10 Mb/s or 100 Mb/s, and a 1000 Mb/s (i.e., 1 Gb/s) network node 22 that sends and receives data packets at a network speed of 1 Gb/s. The gigabit node 22 may be a server, or a gateway to a high-speed backbone network. Hence, the switches 12 selectively forward data packets received from the network nodes 14 or 22 to the appropriate destination based upon Ethernet protocol.

Each switch 12 includes a media access control (MAC) module 20 that transmits and receives data packets to and from 10/100 Mb/s physical layer (PHY) transceivers 16 via respective shared media independent interfaces (MII) 18 according to IEEE 802.3u protocol. Each switch 12 also includes a gigabit MAC port 24 for sending and receiving data packets to and from a gigabit PHY 26 for transmission to the gigabit node 22 via a high speed network medium 28.

Each 10/100 Mb/s network station 14 sends and receives data packets to and from the corresponding switch 12 via a media 17 and according to either half-duplex or full duplex Ethernet protocol. The Ethernet protocol ISO/IEC 8802-3 (ANSI/IEEE Std. 802.3, 1993 Ed.) defines a half-duplex media access mechanism that permits all stations 14 to access the network channel with equality. Traffic in a half-duplex environment is not distinguished or prioritized over the medium 17. Rather, each half-duplex station 14 includes an Ethernet interface card that uses carrier-sense multiple access with collision detection (CSMA/CD) to listen for traffic on the media. The absence of network traffic is detected by sensing a deassertion of a receive carrier on the media. Any station 14 having data to send will attempt to access the channel by waiting a predetermined time after the deassertion of a receive carrier on the media, known as the interpacket gap interval (IPG). If a plurality of stations 14 have data to send on the network, each of the stations will attempt to transmit in response to the sensed deassertion of the receive carrier on the media and after the IPG interval, resulting in a collision. Hence, the transmitting station will monitor the media to determine if there has been a collision due to another station sending data at the same time. If a collision is detected, both stations stop, wait a random amount of time, and retry transmission.

The 10/100 Mb/s network stations 14 that operate in full duplex mode send and receive data packets according to the Ethernet standard IEEE 802.3u. The full-duplex environment provides a two-way, point-to-point communication link enabling simultaneous transmission and reception of data packets between each link partner, i.e., the 10/100 Mb/s network station 14 and the corresponding switch 12.

Each switch 12 is coupled to 10/100 physical layer (PHY) transceivers 16 configured for sending and receiving data packets to and from the corresponding switch 12 across a corresponding shared media independent interface (MII) 18. In particular, each 10/100 PHY transceiver 16 is configured for sending and receiving data packets between the switch 12 and up to four (4) network stations 14 via the shared MII 18. A magnetic transformer 19 provides AC coupling between the PHY transceiver 16 and the corresponding network medium 17. Hence, the shared MII 18 operates at a data rate sufficient to enable simultaneous transmission and reception of data packets by each of the network stations 14 to the corresponding PHY transceiver 16.

Each switch 12 also includes an expansion port 30 for transferring data between other switches according to a prescribed protocol. For example, each expansion port 30 can be implemented as a second gigabit MAC port similar to the port 24, enabling multiple switches 12 to be cascaded together as a separate backbone network.

Figure 2:
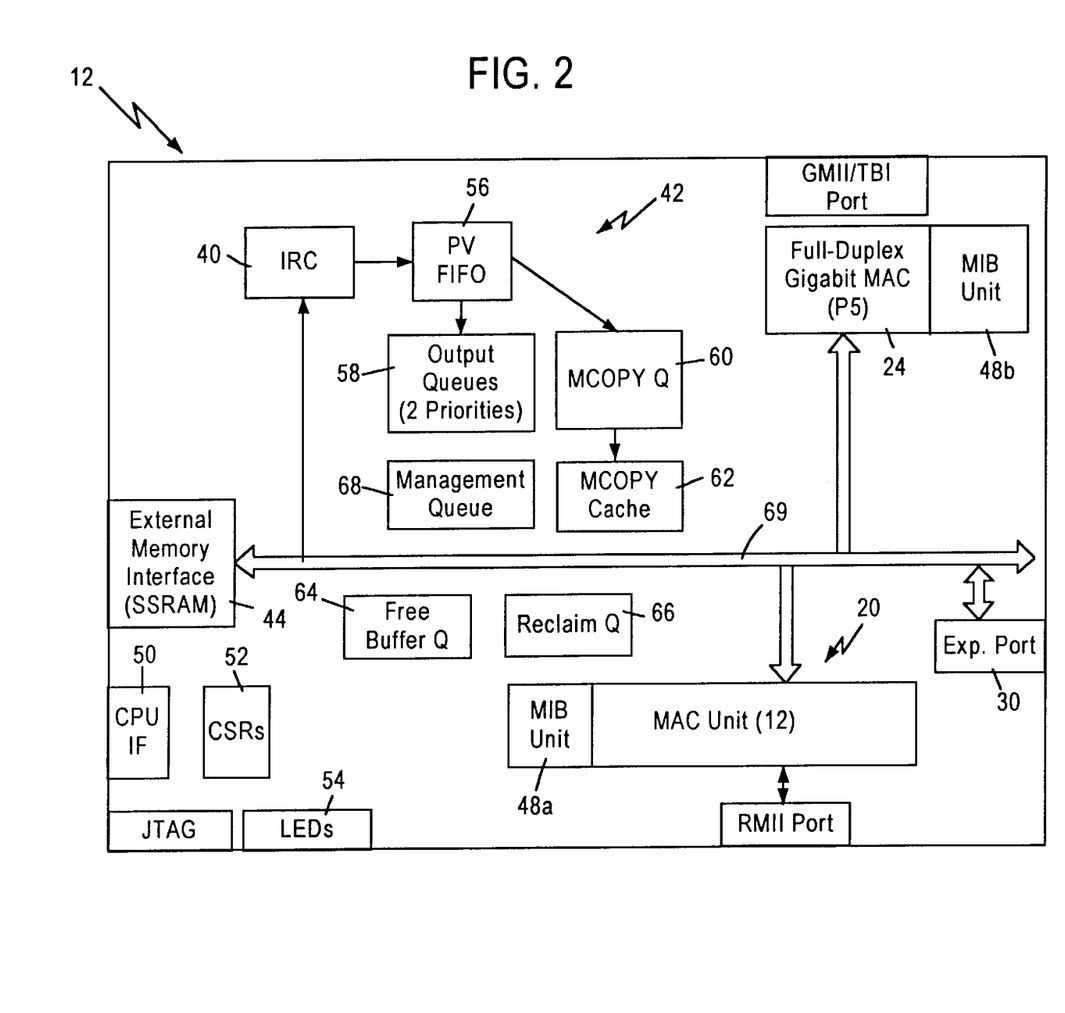
FIG. 2 is a block diagram of the multiple port switch of FIG. 1.

FIG. 2 is a block diagram of the switch 12. The switch 12 contains a decision making engine 40 that performs frame forwarding decisions, a switching subsystem 42 for transferring frame data according to the frame forwarding decisions, a buffer memory interface 44, management information base (MIB) counters 48, and MAC (media access control) protocol interfaces 20 and 24 to support the routing of data packets between the Ethernet (IEEE 802.3) ports serving the network stations 14 and 22. The MIB counters 48 provide statistical network information in the form of management information base (MIB) objects to an external management entity controlled by a host CPU 32, described below.

The external memory interface 44 enables external storage of packet data in a synchronous static random access memory (SSRAM) 36 in order to minimize the chip size of the switch 12. In particular, the switch 12 uses the SSRAM 36 for storage of received frame data, memory structures, and MIB counter information. The memory 36 is preferably a pipelined burst SSRAM having a 64-bit wide data path, a 16-bit wide address path, and a memory size of at least 512 Kbytes, capable of running at clock frequencies up to 66 Mhz.

The switch 12 also includes a processing interface 50 that enables an external management entity such as a host CPU 32 to control overall operations of the switch 12. In particular, the processing interface 50 decodes CPU accesses within a prescribed register access space, and reads and writes configuration and status values to and from configuration and status registers 52.

The internal decision making engine 40, referred to as an internal rules checker (IRC), makes frame forwarding decisions for data packets received from one source to at least one destination station.

The switch 12 also includes an LED interface 54 that clocks out the status of conditions per port and drives external LED logic. The external LED logic drives LED display elements that are human readable.

The switching subsystem 42, configured for implementing the frame forwarding decisions of the IRC 40, includes a port vector first in first out (FIFO) buffer 56, a plurality of output queues 58, a multicopy queue 60, a multicopy cache 62, a free buffer queue 64, and a reclaim queue 66.

The MAC unit 20 includes modules for each port, each module including a MAC receive portion, a receive FIFO buffer, a transmit FIFO buffer, and a MAC transmit portion. Data packets from a network station 14 are received by the corresponding MAC port and stored in the corresponding receive FIFO. The MAC unit 20 obtains a free buffer location (i.e., a frame pointer) from the free buffer queue 64, and outputs the received data packet from the corresponding receive FIFO to the external memory interface 44 for storage in the external memory 36 at the location specified by the frame pointer.

The IRC 40 monitors (i.e., "snoops") the data bus to determine the frame pointer value and the header information of the received packet (including source, destination, and VLAN address information). The IRC 40 uses the frame pointer value and the associated header information to determine which MAC ports will output the data packet stored at the location specified by the frame pointer. The decision making engine may thus determine that a given data packet should be output by either a single port, multiple ports, or all ports (i.e., broadcast). For example, each data packet includes a header having source and destination address, where the decision making engine 40 may identify the appropriate output MAC port based upon the destination address. Alternatively, the destination address may correspond to a virtual address that the appropriate decision making engine identifies as corresponding to a plurality of network stations. Alternatively, the received data packet may include a VLAN (virtual LAN) tagged frame according to IEEE 802.1d protocol that specifies another network (e.g., via a gateway 22) or a prescribed group of stations. The IRC 40 may also determine that the received data packet should be transferred to another switch 12 via the expansion port 30. Hence, the internal rules checker 40 will decide whether a frame temporarily stored in the buffer memory 36 should be output to a single MAC port or multiple MAC ports.

The internal rules checker 40 outputs a forwarding decision to the switch subsystem 42 in the form of a forwarding descriptor. The forwarding descriptor includes a port vector identifying each MAC port that should receive the data packet, priority class identifying whether the frame is high priority or low priority, VLAN information, Rx port number, Opcode, and frame pointer. The port vector identifies the MAC ports to receive the data packet for transmission (e.g., 10/100 MAC ports 1–12, Gigabit MAC port, and/or Expansion port). The port vector FIFO 56 decodes the forwarding descriptor including the port vector, and supplies the frame pointer to the appropriate output queues 58 that correspond to the output MAC ports to receive the data packet transmission. In other words, the port vector FIFO 56 supplies the frame pointer on a per-port basis. The output queues 58 fetch the data packet identified in the port vector from the external memory 36 via the external memory interface 44, and supply the retrieved data packet to the appropriate transmit FIFO of the identified ports. If a data packet is to be supplied to a management agent, the frame pointer is also supplied to a management queue 68, which can be processed by the host CPU 32 via the CPU interface 50.

The multicopy queue 60 and the multicopy cache 62 keep track of the number of copies of the data packet that are fetched from the respective output queues 58, ensuring that the data packet is not overwritten in the SSRAM 36 until the appropriate number of copies of the data packet have been output from the SSRAM 36. Once the number of copies corresponds to the number of ports specified in the port vector FIFO, the port vector is forwarded to the reclaim queue 66. The reclaim queue stores frame pointers that can be reclaimed by the free buffer queue 64 as free pointers. After being returned to the free buffer queue 64, the frame pointer is available for reuse by the MAC unit 20 or the gigabit MAC unit 24.

Figures 3, 3A:
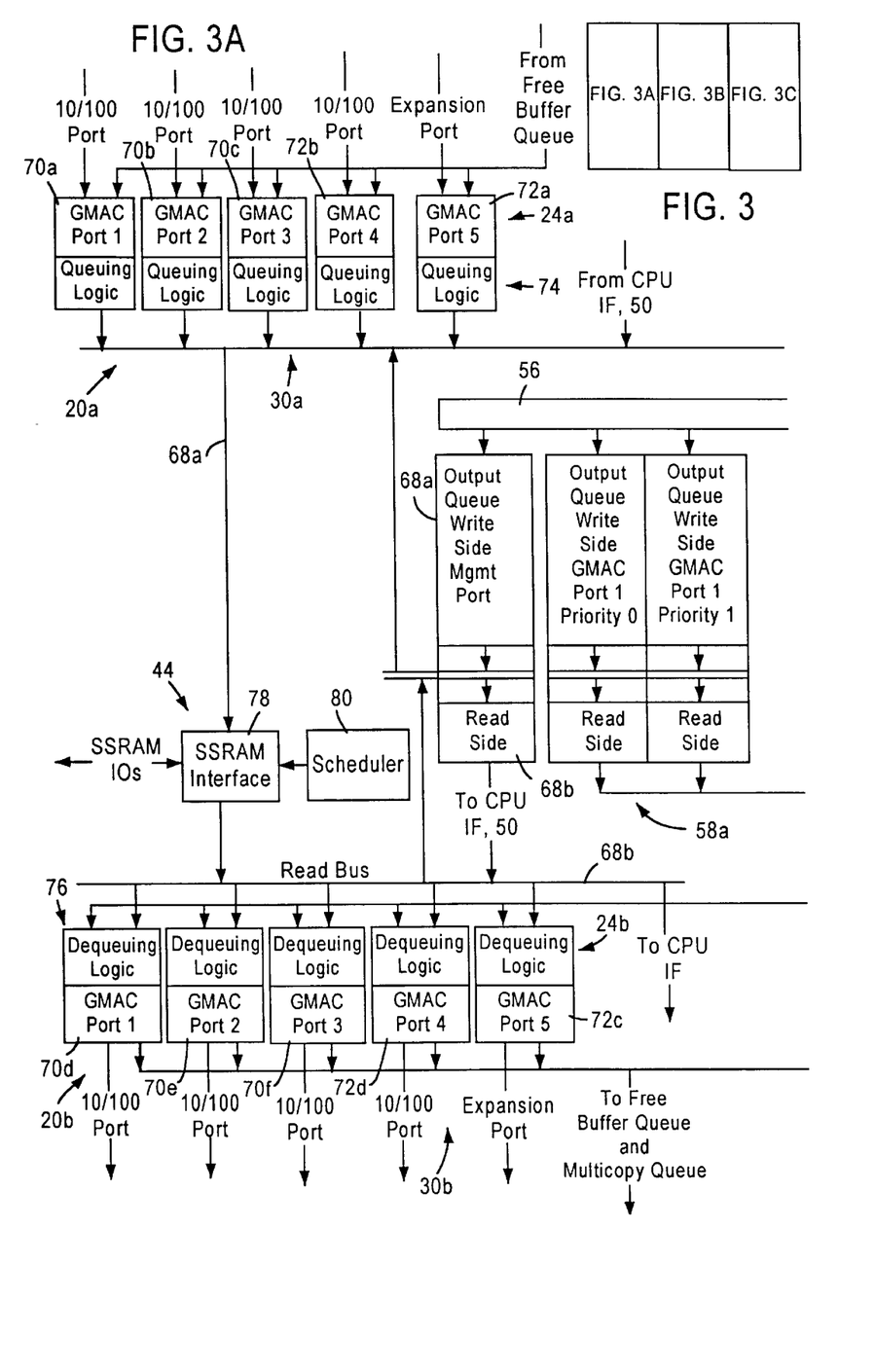
FIG. 3 is a block diagram illustrating in detail the switching subsystem of FIG. 2.
Figure 3B:
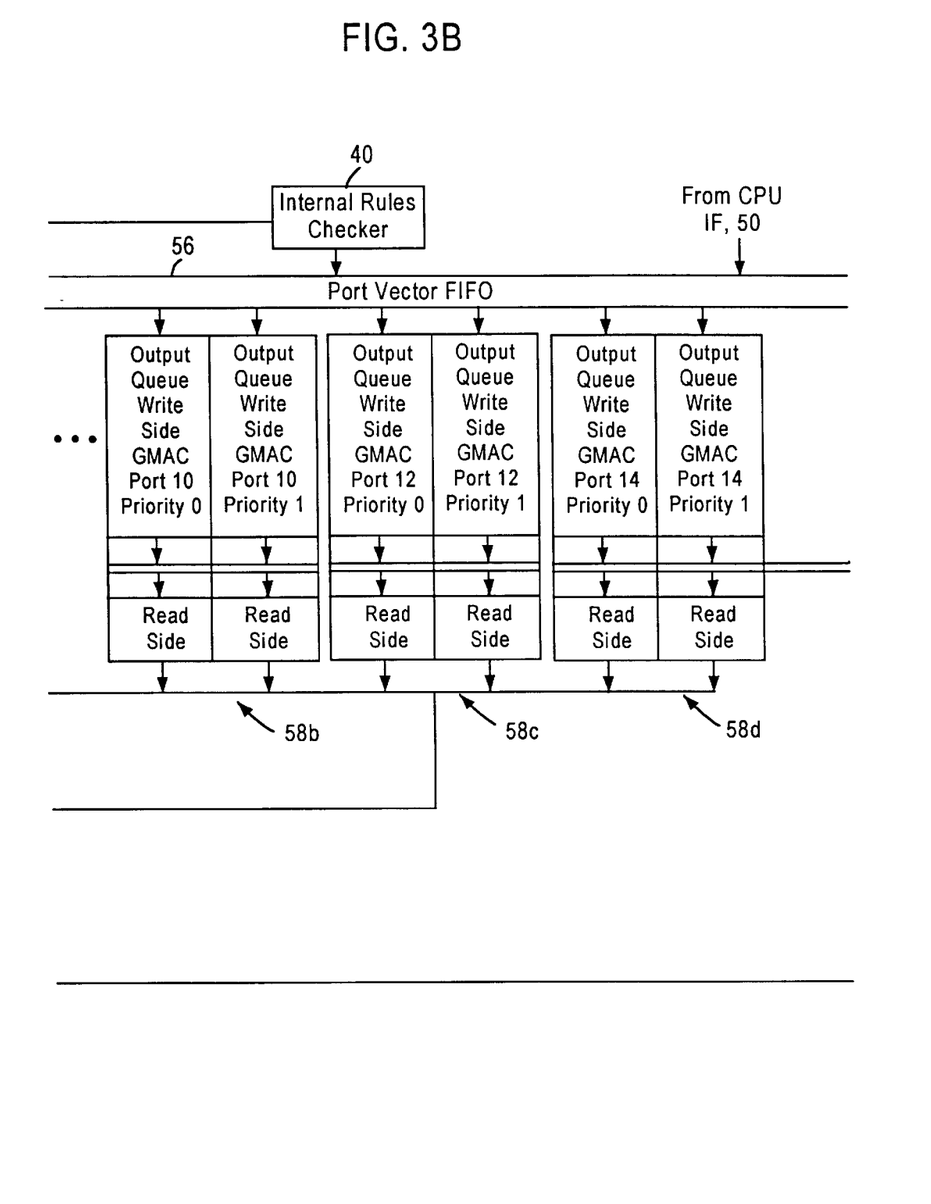
Figure 3C:
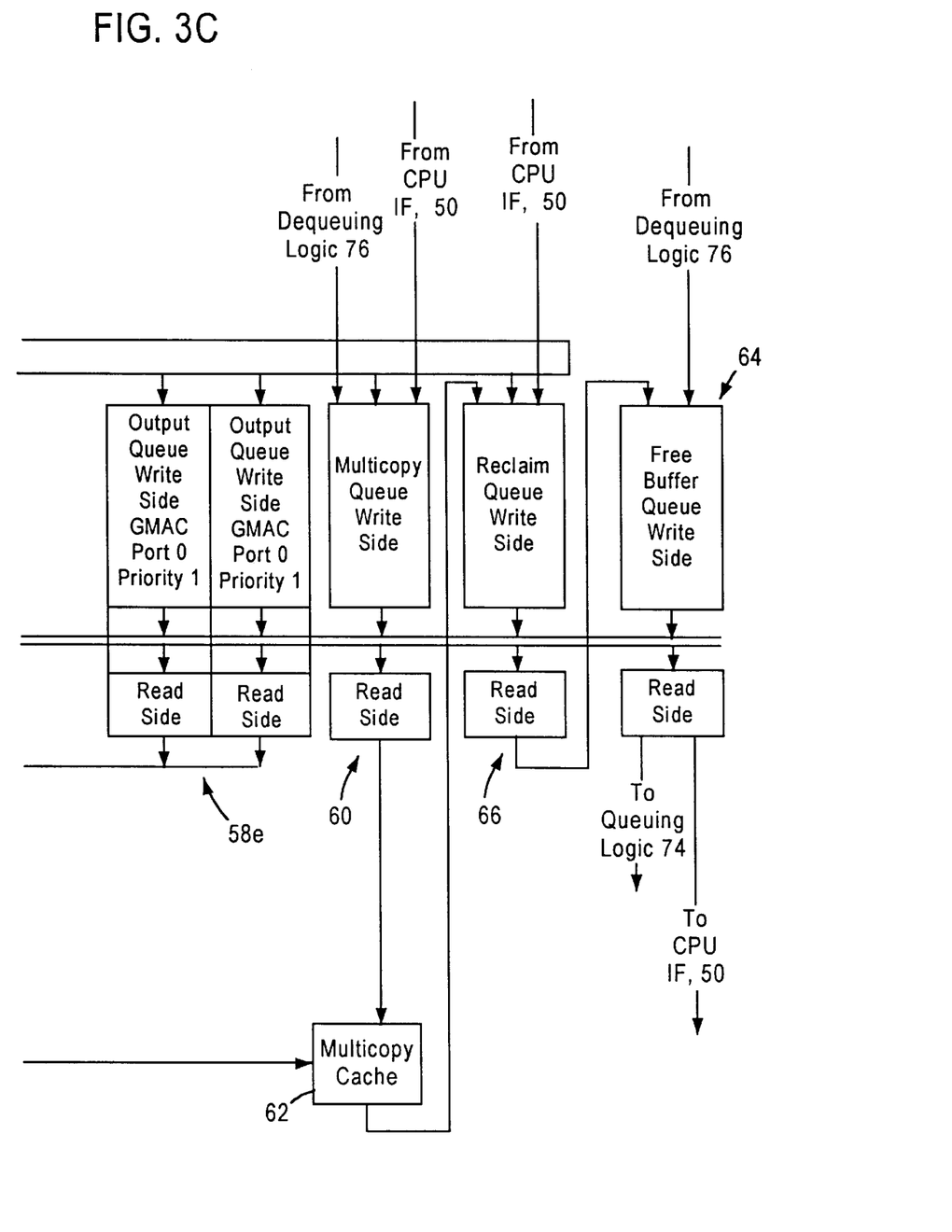

FIG. 3 depicts the switch subsystem 42 of FIG. 2 in more detail according to an exemplary embodiment of the present invention. Other elements of the multiport switch 12 of FIG. 2 are reproduced in FIG. 3 to illustrate the connections of the switch subsystem 42 to these other elements.

As shown in FIG. 3, the MAC module 20 includes a receive portion 20a and a transmit portion 20b. The receive portion 20a and the transmit portion 20b each include three (3) quad-MAC enhanced (QMACE) modules 70 configured for performing the corresponding receive or transmit function for four (4) switch ports according to IEEE 802.3 protocol. Hence, QMACE module 70a performs receive MAC operations for 10/100 Mb/s switch ports 0, 1, 2, 3; module 70b performs receive MAC operations for 10/100 Mb/s switch ports 4, 5, 6, 7; and module 70c performs receive MAC operations for 10/100 Mb/s switch ports 8, 9, 10, and 11. The QMACE modules 70d, 70e, and 70f perform the transmit MAC operations for the 10/100 Mb/s switch ports complementary to modules 70a, 70b, and 70c, respectively. The receive portions 24a and 30a of the gigabit MAC port 24 and the expansion port 30 also have receive MAC modules 72a and 72b optimized for the respective ports. The transmit portions 24b and 30b of the gigabit MAC port 24 and the expansion port 30a also have transmit MAC modules 72c and 72d, respectively. The MAC modules are configured for full-duplex operation on the corresponding port, and the gigabit MAC modules 72a and 72c are configured in accordance with the Gigabit Proposed Standard IEEE Draft P802.3z.

Each of the receive MAC modules 70a, 70b, 70c, 72a, and 72b include queuing logic 74 for transferring of receive data from the corresponding internal receive FIFO to the external memory 36 and the rules checker 40. Each of the transmit MAC modules 70d, 70e, 70f, 72c, and 72d include dequeuing logic 76 for transferring data from the external memory 36 to the corresponding internal transmit FIFO. The queuing logic 74 fetches frame pointers from the free buffer queue 64, and uses the fetched frame pointers to store receive data to the external memory 36 via the external memory interface controller 44. The frame buffer pointer specifies the location in external memory 36 where the received data frame will be stored by the receive FIFO. The queuing logic 74 issues a write request to the external memory interface 44.

The external memory interface 44 includes a scheduler 80 for controlling memory access by the queuing logic 74 or dequeuing logic 76 by any switch port to the external memory 36, and an SSRAM interface 78 for performing the read and write operations with the SSRAM 36. In particular, the switch 12 is configured to operate as a non-blocking switch, where network data is received and output from the switch ports at the respective wire rates of 10, 100, or 1000 Mb/s. Hence, the scheduler 80 controls the access by different ports to optimize usage of the bandwidth of the external memory 36.

Each receive MAC 24a stores a data frame in an internal FIFO upon reception from the corresponding switch port. The corresponding queuing logic 74 obtains a frame pointer and sends a write request to the external memory interface 44. The scheduler 80 schedules the write request with other write requests or any read requests from the dequeuing logic 76, and generates a grant for the requesting queuing logic 74 to initiate a transfer at the scheduled event (i.e., slot). The frame data is then transferred over data bus 68a from the receive FIFO to the external memory 36 in a direct memory access (DMA) transaction during the assigned slot. The frame is stored in the location pointed to by the free buffer pointer obtained from the free buffer pool 64, although a number of other buffers may be used to store a frame, as will be described.

The rules checker 40 also receives the frame pointer and the header information (including source address, destination address, VLAN tag information, etc.) by monitoring (i.e., snooping) the DMA write transfer on the bus 68a. The rules checker 40 uses the header information to make the forwarding decision and generate a forwarding instruction in the form of a forwarding descriptor that includes a port vector. The port vector has a bit set for each output port to which the frame should be forwarded. If the received frame is a unicopy frame, only one bit is set in the port vector generated by the rules checker 40. The bit that is set in the port vector corresponds to a particular one of the ports.

The rules checker 40 outputs the forwarding descriptor including the port vector and the frame pointer into the port vector FIFO 56. The port vector is examined by the port vector FIFO 56 to determine which particular output queue, e.g. at least one of the queues 58 or the management queue 68, should receive the associated frame pointer. The port vector FIFO 56 places the frame pointer into the top of the appropriate queue 58 and/or 68. This queues the transmission of the frame. The output queue 58 is processed separately by the host CPU 32 via the CPU interface 50.

As shown in FIG. 3, each of the transmit MAC units 70d, 70e, 70f, 2d, and 72c have an associated output queue 58a, 58b, 58c, 58d, and 58e, respectively. Each of the output queues 58 have a high priority queue for high priority frame pointers, and a low priority queue for low priority frame pointers. The high priority frame pointers are used for data frames that require a guaranteed access latency, e.g., frames for multimedia applications or management MAC frames. The frame pointers stored in the FIFO-type output queues 58 are processed by the dequeuing logic 76 for the respective transmit MAC units. At some point in time, the frame pointer reaches the bottom of an output queue 58, for example the output queue 58*e* for the gigabit transmit MAC 72*c*. The dequeuing logic 76 for the transmit gigabit port 24*b* takes the frame pointer from the corresponding gigabit port output queue 58*e*, and issues a request to the scheduler 80 to read the frame data from the external memory 36 at the memory location specified by the frame pointer. The scheduler 80 schedules the request, and issues a grant for the dequeuing logic 76 of the transmit gigabit port 24*b* to initiate a DMA read during the assigned slot. In response to the grant, the dequeuing logic 76 reads the frame data in a DMA transaction from the location in external memory 36 pointed to by the frame pointer, stores the frame data in the internal transmit FIFO for transmission by the transmit gigabit MAC 72*c*. If the frame pointer specifies a unicopy transmission, the frame pointer is returned to the free buffer queue 64 following writing the frame data into the transmit FIFO.

A multicopy transmission is similar to the unicopy transmission, except that the port vector has multiple bits set, designating the multiple ports from which the frame will be transmitted. The frame pointer is placed into each of the appropriate output queues 58 and transmitted by the appropriate transmit MAC units 20*b*, 24*b*, and/or 30*b*.

The free buffer pool 64, the multicopy queue 60, the reclaim queue 66, and the multicopy cache 62 are used to manage use of frame pointers and reuse of frame pointers once the frame has been transmitted to its designated output port(s). In particular, the dequeuing logic passes frame pointers for unicopy frames to the free buffer queue 64 after the buffer contents have been copied to the appropriate transmit FIFO.

For multicopy frames, the port vector FIFO 56 supplies multiple copies of the same frame pointer to more than one output queue 58, each frame pointer having a unicopy bit set to zero. The port vector FIFO also copies the frame pointer and the copy count to the multicopy queue 60. The multicopy queue writes the copy count to the multicopy cache 62. The multicopy cache is a random access memory having a single copy count for each buffer in external memory (i.e., each frame pointer).

Once the dequeuing logic 76 retrieves the frame data for a particular output port based on a fetched frame pointer and stores the frame data in the transmit FIFO, the dequeuing logic checks if the unicopy bit is set to 1. If the unicopy bit is set to 1, the frame pointer is returned to the free buffer queue 64. If the unicopy bit is set to zero indicating a multicopy frame pointer, the dequeuing logic 76 writes the frame pointer with a copy count of minus one (−1) to the multicopy queue 60. The multicopy queue 60 adds the copy count to the entry stored in the multicopy cache 62.

When the copy count multicopy cache 62 for the frame pointer reaches zero, the frame pointer is passed to the reclaim queue 66. Since a plurality of frame pointers may be used to store a single data frame in multiple buffer memory locations, the frame pointers are referenced to each other to form a linked-list chain of frame pointers to identify the entire stored data frame. The reclaim queue 66 traverses the chain of buffer locations identified by the frame pointers, and passes the frame pointers to the free buffer queue 64.

As discussed above, the internal rules checker (IRC) 40 monitors the write bus to capture frame header information (including source, destination, and VLAN address information) and frame pointers associated with received frames. The IRC 40 uses the frame pointer value and the associated header information to determine which MAC ports will output the data frame stored at the location specified by the frame pointer.

Figure 4:
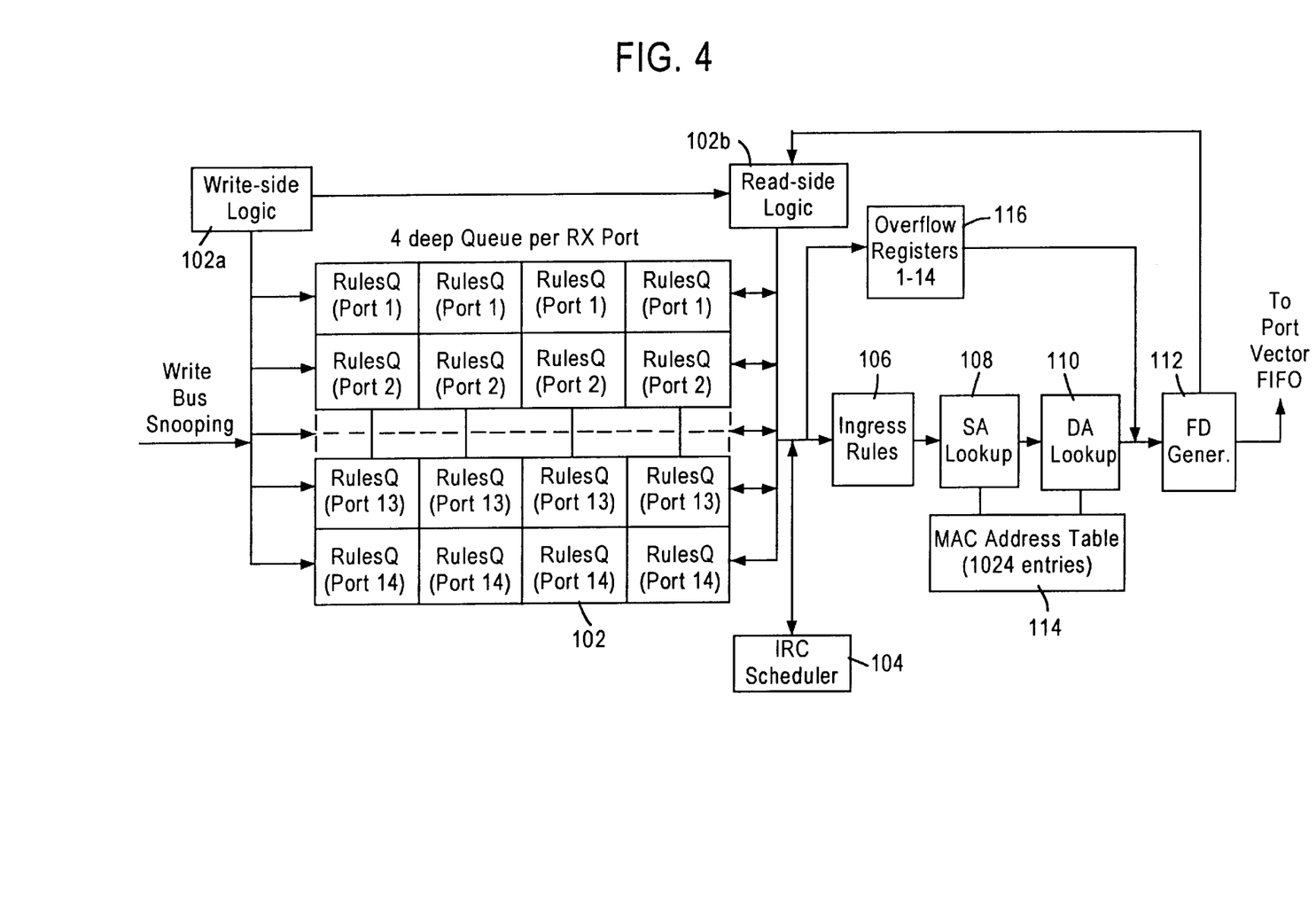
FIG. 4 is a block diagram of an internal rules checker having an overflow bypass of the present invention.

As shown in FIG. 4, the IRC 40 may contain multiple rules queues 102 arranged for holding frame pointers and frame header information. A single rules queue 102 is assigned to each receive port of the IMS 12 for storing information associated with the frames received via the corresponding port. In particular, rules queues 1 to 12 may be provided for 10/100 MAC ports 1 to 12 configured to receive data from the corresponding 10/100 Mb/s network stations 14, a rules queue 13 may be arranged to support the gigabit MAC port 24 capable of receiving data from the gigabit network node 22, and a rules queue 14 may be assigned to the expansion port 30. Each rules queue 102 may store frame headers in a synchronous random access memory (SRAM) having four 40-byte entries and may store frame pointers in a SRAM having four 13-bit entries. Rules queue (RQ) write-side logic 102*a* controls writing of frame headers and frame pointers into the corresponding SRAMs. RQ read-side logic 102*b* controls reading of frame headers and frame pointers from the rules queues 102 to IRC logic circuits such as ingress rules logic 106, source address (SA) lookup logic 108, destination address (DA) lookup logic 110 and forward descriptor (FD) generator 112 to produce a forwarding descriptor supplied to the port vector FIFO 56. The IRC scheduler 104 provides time slots for sequential transferring data held in the rules queues 102 to the IRC logic circuitry.

The ingress rules logic 106 detects whether a frame was received with an error and checks for preset DA and VLAN information. If an error is detected or the frame address information does not match with allocated DA addresses or VLAN data, the ingress rules logic 106 produces a forwarding descriptor with a null port vector. This forwarding descriptor is transferred directly to the port vector FIFO 56 without performing SA and DA lookup operations and egress rules operations.

The SA and DA lookup logic circuits 108 and 110 search an IRC MAC address table 114 for entries associated with the MAC source and destination addresses for the corresponding frame. If source and destination address data of a frame match with the address table entries, the FD generator 112 checks each transmit port in the port vector list produced by the DA lookup logic circuit 110 to remove or mask the disabled ports, the ports that do not belong to a required VLAN, and the port, from which the frame is received. As a result, the FD generator 112 generates a forwarding descriptor including a port vector identifying each MAC port that should receive the corresponding frame.

In accordance with the present invention, an RQ overflow handling system is provided to allow frame pointers to bypass the circuits 106, 108 and 110 and go directly to the FD generator 112, when an overflow state of any of the rules queues 102 is detected. The RQ overflow handling system comprises multiple overflow registers 116 allocated to different receive ports of the IMS 12. Each overflow register 116 receives frame pointers when the write-side logic 102*a* detects that the rules queue 102 for the corresponding receive port is full.

For example, a 2×13-bit two-entry overflow register 116 may be allocated to each receive port of the IMS 112. Overflow registers 1 to 12 may be provided to support 10/100 MAC ports 1–12, overflow register 13 may be arranged for frame pointers associated with data received via the gigabit MAC port 24, and overflow register 14 may be assigned to the expansion port 30. Each of the entries of the overflow register 116 is capable of storing a single 13-bit frame pointer associated with data received via the corresponding receive port.

Before generating write address for storing frame header data and frame pointer associated with a received data frame in a rules queue 102 for a given receive port, the write-side logic 102a determines whether or not the rules queue 102 is full. If the rules queue 102 is full, the write-side logic 102a places the frame pointer associated with that port to the first 13-bit entry of the corresponding overflow register 116. When the end of the received data frame is detected, the write-side logic 102a moves the frame pointer from the first entry to the second 13-bit entry of the same overflow register 116 and supplies the read-side logic 102b with a write-side RQ overflow request RQ_WR_OVREQ.

As described in more detail below, the read-side logic 102b contains RQ overflow handling logic that performs arbitration between overflow requests representing different overflow registers 116 to transfer overflowing frame pointers from the corresponding overflow registers 116 to the FD generator 112. Thus, the RQ overflow handling system of the present invention prevents loss of frame pointers due to overflow conditions in rules queues.

Figure 5:
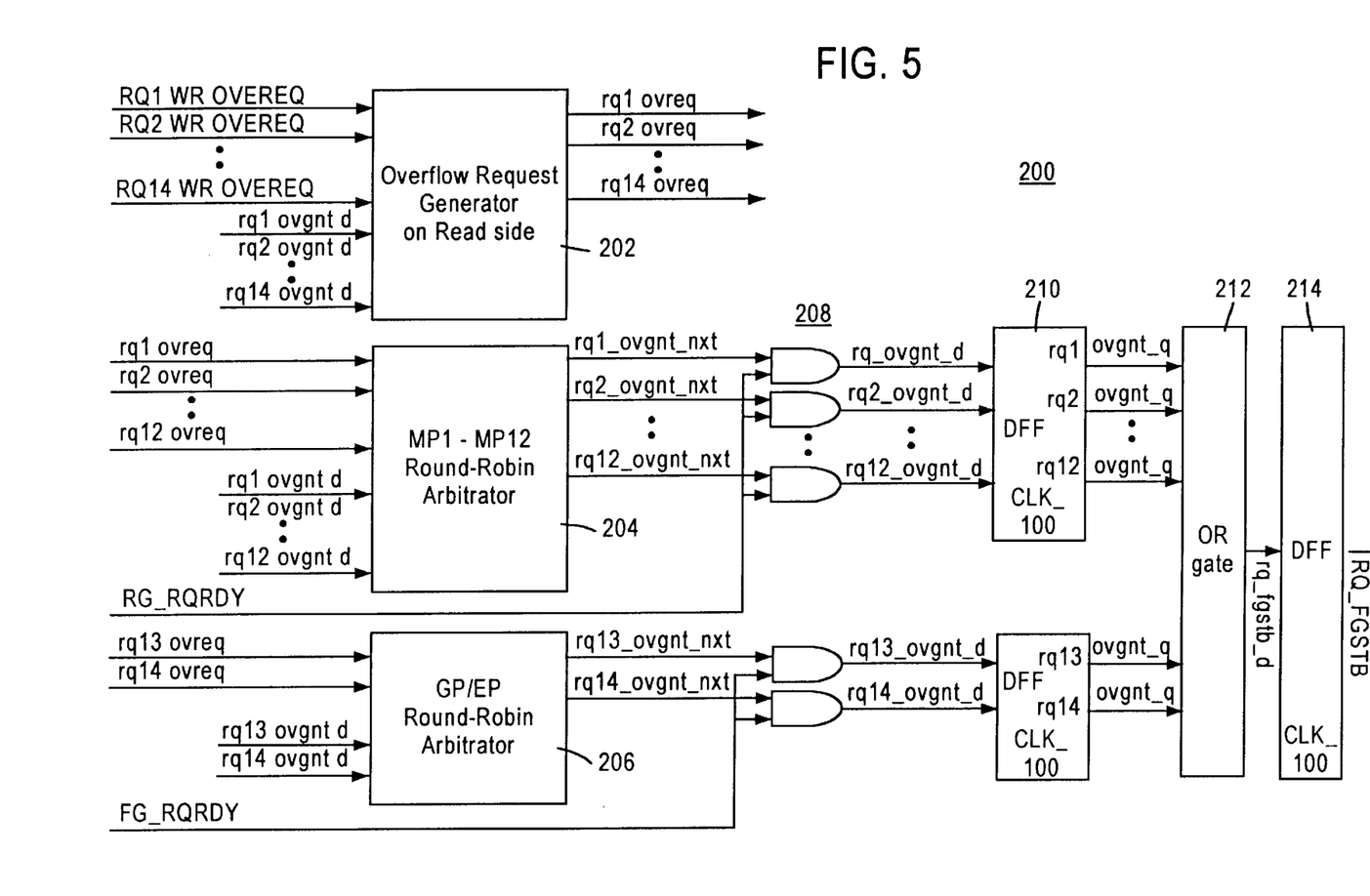
FIG. 5 is a block diagram of overflow handling logic of the present invention.

The RQ overflow handling system of the present invention will be described below with references to FIG. 5 that shows a block-diagram of RQ overflow handling logic 200 and FIG. 6 that shows a flow-chart of a overflow handling procedure. As shown in FIG. 5, the RQ overflow handling logic 200 of the present invention comprises an overflow request generator 202 that receives the write-side RQ overflow requests RQ1_WR_OVREQ to RQ14_WR_OVREQ for the overflow registers 1 to 14, respectively. Round-robin arbitrators 204 and 206 are coupled to the overflow request generator 202 for performing arbitration between RQ overflow requests rq1_ovreq to rg14_ovreq produced by the overflow request generator 202. As a result of the arbitration, the arbitrators 204 and 206 issue an RQ grant signal to allow the corresponding overflow register 116 to transfer its frame pointer to the FD generator 112.

In particular, the round-robin arbitrator 204 arbitrates between the RQ overflow requests rq1_ovreq to rq12_ovreq corresponding to the 10/100 MAC ports 1 to 12, whereas the round-robin arbitrator 206 arbitrates between the RQ overflow requests rq13_ovreq and rq14_ovreq respectively representing the gigabit port 24 and the expansion port 30. For example, the RQ overflow requests for gigabit port 24 and the expansion port 30 may have a higher priority than the RQ overflow requests corresponding to the 10/100 MAC ports 1–12. Also, the RQ overflow handling logic 200 comprises an AND gate 208 for each of the receive ports of the IMS 12, a D-flip-flop 210 provided for each the receive ports, an OR gate 212 having 14 inputs corresponding to the receive ports, and a D-flip-flop 214.

Figure 6:
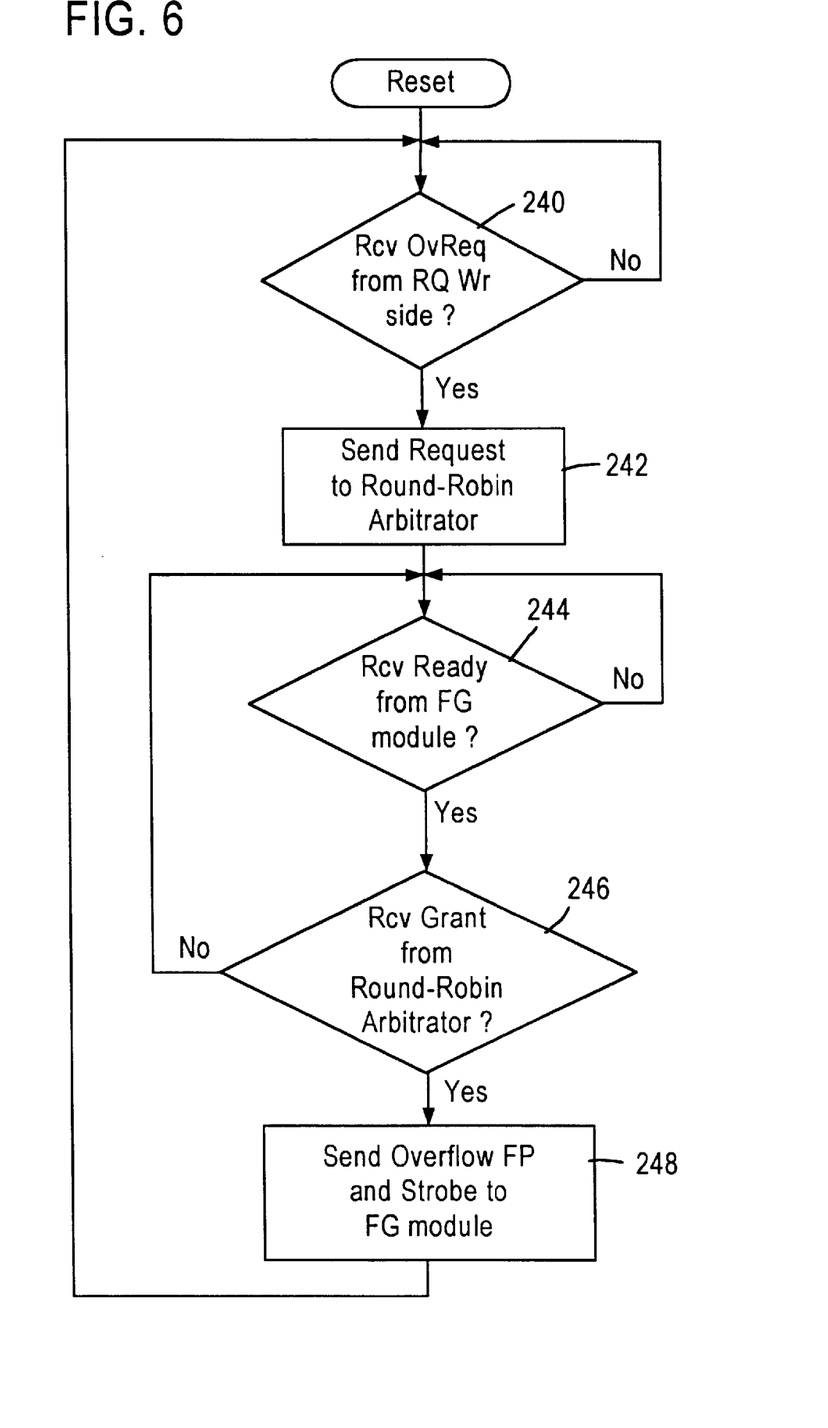
FIG. 6 is a flow chart illustrating operations of the overflow handling logic of the present invention.

As illustrated in FIG. 6, the overflow request generator 202 detects a write-side RQ overflow request from the write-side logic 102a (block 240) and produces a read-side RQ overflow request sent to an appropriate round-robin arbitrator 204 or 206 (block 242). If the received write-side RQ overflow request relates to an overflow register 116 that supports one of 10/100 MAC ports 1–12, the read-side overflow request is supplied to the arbitrator 204. If the received write-side RQ overflow request represents the overflow register 116 corresponding to the gigabit port 24 or expansion port 30, the read-side overflow request is sent to the arbitrator 206.

Then, the overflow handling logic 200 determines whether or not the FD generator 112 is ready for receiving an overflowing frame pointer from the overflow register 116 (block 244). In particular, the FD generator 112 supplies an RQ ready signal FG_RQRDY to a first input of each of the AND gates 208. If the overflow request for one of the MAC ports 1–12 and the overflow request for gigabit or expansion port is received at the same time, the RQ ready signal FG_RQRDY will go to the AND gate 208 corresponding to the gigabit or expansion port, because the RQ overflow requests for gigabit port 24 and the expansion port 30 have a higher priority than the RQ overflow requests corresponding to the 10/100 MAC ports 1–12.

If the RQ ready signal is received, the overflow handling logic 200 checks whether or not an RQ grant signal is received from the round-robin arbitrator 204 or 206 (block 246). The arbitrators 204 and 206 perform the round-robin scheduling known to one skilled in the art. The round-robin scheduling keeps track of the history of the grants to RQ overflow requests for different ports. The port with the last granted request becomes the lowest priority. For example, after the arbitrator 204 issues the RQ grant signal for port 1, all RQ overflow requests for port 1 are pushed back to the end of the request queue supplied to the arbitrator 204. The RQ overflow request for the next port 2 becomes the highest priority, followed by the overflow requests for ports 3, 4, etc.

The RQ grant signal for a given port is supplied from the arbitrator 204 or 208 to a second input of the corresponding AND gate 208. When the RQ grant signal is received, the frame pointer is transferred from the corresponding overflow register 116 to the FD generator 112 enabled by an RQ strobe from the overflow handling logic 200 to receive the frame pointer (block 248). In particular, the output signal of the corresponding AND gate 208 (rq_ovgnt_d) passes the corresponding D-flip-flop 210, the OR gate 212 and the D-flip-flop 214 to produce the RQ strobe (RQ_FGSTB) supplied to the FD generator 112 to enable it to receive a frame pointer from the overflow register 116 corresponding to the port represented by the granted RQ overflow request.

Simultaneously, the output signal of the AND gate 208 is supplied back to the corresponding arbitrator 204 or 206 and to the overflow request generator 202 to identify the port with the last granted RQ overflow request. This information is used by the arbitrators 204 and 206 for performing the round-robin scheduling and by the overflow request generator 202 for resolving conflicts between RQ write-side overflow requests. Then, the system returns back to detecting the next RQ write-side overflow request (block 240).

In this disclosure, there are shown and described only the preferred embodiments of the invention, but it is to be understood that the invention is capable of changes and modifications within the scope of the inventive concept as expressed herein.

What is claimed is:

1. A multiport data communication system for transferring data packets between ports, the data communication system comprising:
   a plurality of receive ports for receiving data packets,
   a decision making engine responsive to the received data packets for controlling transmission of the received data packets to at least one selected transmit port,
   the decision making engine including:
   a plurality of queuing devices corresponding to the plurality of the receive ports for queuing data blocks representing the data packets received by the corresponding receive ports, logic circuitry responsive to the plurality of queuing devices for processing the data blocks in accordance with a prescribed algorithm, a forwarding circuit responsive to the logic circuitry for identifying the at least one selected transmit port for each data packet, and an overflow handling circuit for providing an overflow bypass for bypassing the logic circuitry to transfer at least a portion of a data block representing a received data packet directly to the forwarding circuit when at least one of the plurality of the queuing devices is in an overflow state.

2. The system of claim 1, wherein the data blocks include pointers for indicating memory locations for storing the received data packets.

3. The system of claim 2, wherein the overflow handling circuit is configured to allow the pointers to bypass the logic circuitry.

4. The system of claim 1, wherein the overflow handling circuit comprises a plurality of overflow registers corresponding to the plurality of the receive ports for holding overflow data when the corresponding queuing device is in the overflow state.

5. The system of claim 4, wherein each of the overflow registers comprises first and second sections, each of the sections is configured for storing the at least a portion of a data block.

6. The system of claim 5, wherein the overflow handling circuit is configured to supply the at least a portion of a data block to the first section of an overflow register when the overflow handling circuit detects that the corresponding queuing device is in the overflow state.

7. The system of claim 6, wherein the overflow handling circuit is configured to transfer the at least a portion of a data block from the first section to the second section of the overflow register when an end of a data packet represented by the data block is detected.

8. The system of claim 4, wherein the overflow handling circuit comprises at least one arbitrator for performing arbitration between requests for access to the forwarding circuit for the plurality of overflow registers.

9. The system of claim 8, wherein the plurality of receive ports include regular ports, at least one high-speed port for receiving data packets at a rate higher than a rate at the regular ports, and at least one expansion port for receiving data packets from other communication systems.

10. The system of claim 9, wherein requests for access to the forwarding circuit for the overflow registers corresponding to the high-speed and expansion ports have a higher priority than requests for access to the forwarding circuit for the overflow registers corresponding to the regular ports.

11. The system of claim 9, wherein the overflow handling circuit comprises a first arbitrator for performing arbitration between requests for access to the forwarding circuit for the overflow registers corresponding to the regular ports.

12. The system of claim 10, wherein the overflow handling circuit comprises a second arbitrator for performing arbitration between requests for access to the forwarding circuit for the overflow registers corresponding to the high-speed and expansion ports.

13. The system of claim 8, wherein the at least one arbitrator is responsive to a request for access to the forwarding circuit for an overflow register of the plurality of overflow registers to produce a grant signal for enabling the forwarding circuit to receive the overflow data from the overflow register.

14. In a communication system having a plurality of receive ports, at least one transmit port, and a decision making engine for controlling data forwarding between the receive port and the at least one transmit port, a method of handling data overflow comprising the steps of:

placing data blocks representing received data packets in a plurality of data queues corresponding to the plurality of the receive ports, processing the data queues by logic circuitry in accordance with a prescribed algorithm, making a forwarding decision to determine the at least one transmit port, and providing an overflow bypass to allow at least a portion of a data block representing a received data packet to bypass the logic circuitry, when at least one of the plurality of data queues is in an overflow state.

15. The method of claim 14, wherein the data blocks include pointers for indicating memory locations for storing the received data packets.

16. The method of claim 15, wherein the pointers are allowed to bypass the logic circuitry when the overflow state is detected.

17. The method of claim 14, wherein the step of providing an overflow bypass comprises buffering overflow data in a plurality of overflow registers corresponding to the plurality of receive ports.

18. The method of claim 17, wherein the step of providing an overflow bypass further comprises performing arbitration between requests for transferring the overflow data from the plurality of the overflow registers.

19. The method of claim 17, wherein the overflow data is buffered in a first section of an overflow register when the overflow state is detected.

20. The method of claim 19, wherein the overflow data is transferred from the first section to a second section of the overflow register when an end of a data packet represented by the overflow data is detected.

* * * * *